US011170225B2

(12) United States Patent
Hassan-Shafique et al.

(10) Patent No.: US 11,170,225 B2
(45) Date of Patent: Nov. 9, 2021

(54) STATIONARY TARGET DETECTION BY EXPLOITING CHANGES IN BACKGROUND MODEL

(71) Applicant: Avigilon Fortress Corporation, Vancouver (CA)

(72) Inventors: Khurram Hassan-Shafique, Ashburn, VA (US); Peter L. Venetianer, McLean, VA (US); Li Yu, Herndon, VA (US); Haiying Liu, Chantilly, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 101 days.

(21) Appl. No.: 16/777,203

(22) Filed: Jan. 30, 2020

(65) Prior Publication Data
US 2020/0234058 A1 Jul. 23, 2020

Related U.S. Application Data

(63) Continuation of application No. 15/716,216, filed on Sep. 26, 2017, now Pat. No. 10,586,113, which is a continuation of application No. 14/610,582, filed on Jan. 30, 2015, now Pat. No. 9,792,503, which is a continuation of application No. 13/957,636, filed on Aug. 2, 2013, now Pat. No. 8,948,458, which is a continuation of application No. 13/770,700, filed on Feb. 19, 2013, now Pat. No. 8,526,678, which is a continuation of application No. 12/204,562, filed on Sep. 4, 2008, now Pat. No. 8,401,229.

(60) Provisional application No. 60/935,862, filed on Sep. 4, 2007.

(51) Int. Cl.
G06K 9/00 (2006.01)
G08B 13/196 (2006.01)
G06K 9/62 (2006.01)

(52) U.S. Cl.
CPC .......... *G06K 9/00771* (2013.01); *G06K 9/62* (2013.01); *G06K 9/6267* (2013.01); *G08B 13/19602* (2013.01)

(58) Field of Classification Search
CPC . G06T 2207/20081; G06T 2207/20084; G06T 7/11; G06N 3/02; G06K 9/00771
See application file for complete search history.

(56) References Cited

U.S. PATENT DOCUMENTS

| 5,136,374 A | 8/1992 | Jayant et al. |
| 5,150,426 A | 9/1992 | Banh et al. |
| 5,182,778 A | 1/1993 | Rudak et al. |
| 5,309,232 A | 5/1994 | Hartung et al. |
| 5,440,081 A | 8/1995 | Thompson |
| 5,715,325 A | 2/1998 | Bang et al. |
| 5,764,803 A | 6/1998 | Jacquin et al. |
| 5,915,044 A | 6/1999 | Gardos et al. |

(Continued)

*Primary Examiner* — Yosef Kassa
(74) *Attorney, Agent, or Firm* — Daniel Hammond

(57) ABSTRACT

A sequence of video frames of an area of interest is obtained. A first background model of the area of interest is constructed based on a first parameter. A second background model of the area of interest is constructed based on a second parameter, the second parameter being different from the first parameter. A difference between the first and second background models is determined. A stationary target is determined based on the determined difference. An alert concerning the stationary target is generated.

18 Claims, 6 Drawing Sheets

(56) References Cited

U.S. PATENT DOCUMENTS

| | | | |
|---|---|---|---|
| 6,061,088 A | 5/2000 | Khosravi et al. | |
| 6,353,450 B1 | 3/2002 | DeLeeuw | |
| 6,433,819 B1 | 8/2002 | Li et al. | |
| 6,556,708 B1 | 4/2003 | Christian et al. | |
| 6,567,116 B1 | 5/2003 | Aman et al. | |
| 6,570,608 B1 | 5/2003 | Tserng | |
| 6,668,036 B2 | 12/2003 | Numata et al. | |
| 6,754,974 B2 | 6/2004 | Bassolino et al. | |
| 6,853,398 B2 | 2/2005 | Malzbender et al. | |
| 6,919,892 B1 | 7/2005 | Cheiky et al. | |
| 7,027,054 B1 | 4/2006 | Cheiky et al. | |
| 7,142,602 B2 | 11/2006 | Porikli et al. | |
| 7,227,893 B1 | 6/2007 | Srinivasa et al. | |
| 7,493,153 B2 | 2/2009 | Ahmed et al. | |
| 7,751,589 B2 | 7/2010 | Bovyrin et al. | |
| 7,751,647 B2 | 7/2010 | Pikaz | |
| 7,813,822 B1 | 10/2010 | Hoffberg | |
| 7,903,871 B2 | 3/2011 | Kaplinsky et al. | |
| 7,904,187 B2 | 3/2011 | Hoffberg et al. | |
| 7,956,735 B2 | 6/2011 | Jackson | |
| 7,957,592 B2 | 6/2011 | Huang et al. | |
| 7,966,078 B2 | 6/2011 | Hoffberg et al. | |
| 8,063,936 B2 | 11/2011 | Samarasekera et al. | |
| 8,073,203 B2 | 12/2011 | Tang et al. | |
| 8,077,969 B2 | 12/2011 | Rossato et al. | |
| 8,094,903 B2 * | 1/2012 | Zhu | G06T 7/215 382/130 |
| 8,103,093 B2 | 1/2012 | Blake et al. | |
| 8,111,913 B2 * | 2/2012 | Dunn | G06T 7/11 382/162 |
| 8,159,536 B2 | 4/2012 | Wang et al. | |
| 8,189,945 B2 | 5/2012 | Stojancic et al. | |
| 8,284,996 B2 | 10/2012 | Winkler | |
| 8,358,691 B1 | 1/2013 | Wang et al. | |
| 8,401,229 B2 * | 3/2013 | Hassan-Shafique | G06K 9/00771 382/103 |
| 8,411,910 B2 * | 4/2013 | Sawides | G06T 7/11 382/117 |
| 8,411,930 B2 | 4/2013 | Ridley et al. | |
| 8,422,775 B2 | 4/2013 | Wang et al. | |
| 8,423,121 B2 * | 4/2013 | Wang | G06T 7/246 600/424 |
| 8,457,401 B2 | 6/2013 | Lipton et al. | |
| 8,477,232 B2 | 7/2013 | Forutanpour | |
| 8,509,526 B2 * | 8/2013 | Haas | G06K 9/00818 382/162 |
| 8,520,975 B2 | 8/2013 | Wang et al. | |
| 8,526,678 B2 * | 9/2013 | Liu | G08B 13/19602 382/103 |
| 8,542,874 B2 | 9/2013 | Hoeflinger | |
| 8,659,592 B2 | 2/2014 | Wang et al. | |
| 8,948,458 B2 | 2/2015 | Hassan-Shafique et al. | |
| 2006/0067562 A1 | 3/2006 | Kamath et al. | |

* cited by examiner

STATIONARY TARGET DETECTION BY EXPLOITING CHANGES IN BACKGROUND MODEL

RELATED APPLICATIONS

This application is a continuation of U.S. application Ser. No. 15/716,216 filed 26 Sep. 2017, which is a continuation of U.S. application Ser. No. 14/610,582 filed 30 Jan. 2015, now U.S. Pat. No. 9,792,503, which is a continuation of U.S. application Ser. No. 13/957,636 filed 2 Aug. 2013, now U.S. Pat. No. 8,948,458, which is a continuation of U.S. application Ser. No. 13/770,700 filed 19 Feb. 2013, now U.S. Pat. No. 8,526,678, which is a continuation of U.S. application Ser. No. 12/204,562, filed 4 Sep. 2008, now U.S. Pat. No. 8,401,229, which claims the benefit of U.S. Provisional Application No. 60/935,862, filed 4 Sep. 2007, the contents of which are incorporated by reference in their entirety.

BACKGROUND

The following relates to video processing systems and methods. More particularly, the following relates to automatic detection of stationary targets in an area of interest and will be described with particular reference thereto. However, it is to be appreciated that the following is applicable to other applications such as, for example, detection of moving targets, changes in the environment, and the like.

Typically, the video system includes an imaging sensor, for example, an electro-optical video camera that provides a sequence of images or frames within a field of view (FOV) of the camera. Intelligent video surveillance systems are often used to automatically detect events of interest such as, for example, potential threats, by detecting, tracking and classifying the targets in the scene. Based on user-defined rules or policies, the intelligent video surveillance systems generate user-alerts if any event in the violation to the user-defined policies is detected. Examples of such events include: monitoring a no parking zone and, for example, initiating an alarm if a car spends more than a certain amount of time in the no parking zone; space management; detecting unattended bags at airports, and other sensitive areas, such as military installations and power plants; detecting the removal of a high value asset, such as an artifact from a museum, an expensive piece of hardware, or a car from a parking lot.

For such applications, the targets that become stationary in the field of view of the imaging sensor need to be detected and classified. One method to detect the stationary targets is to detect moving targets in the area of interest, for example, by employing background subtraction or change detection, e.g., between video frames. For example, a background model is constructed and periodically updated based on a parameter, e.g., a learning rate. Each frame of a video sequence may be registered and compared pixel by pixel to the background model. Pixels that display a substantial difference are considered foreground, or moving, pixels. Pixels that remain unchanged over a pre-specified period of time are considered to be background pixels. In this manner, the moving targets are detected and tracked over time, from one video frame to another. The targets that do not exhibit motion over a user-specified period of time are then deemed stationary targets.

However, this method has limited capabilities. For example, when the area of interest is crowded or has high traffic density, the detection and segmentation of moving targets might provide erroneous results due to frequent occlusions. Another difficulty might arise in tracking a stationary target if other targets move between the stationary target and video camera. It is problematic to determine if the newly detected motion is due to a new target motion or the original stationary target motion.

There is a need for methods and apparatuses that overcome above mentioned difficulties and others.

SUMMARY

An exemplary embodiment of the invention may include a method for image processing, comprising: obtaining a sequence of video frames of an area of interest; constructing a first background model of the area of interest based on a first parameter; constructing a second background model of the area of interest based on a second parameter, the second parameter being different from the first parameter; determining a difference between the first and second background models; determining a stationary target based on the determined difference; and generating an alert concerning the stationary target.

An exemplary embodiment of the invention may include a computer-readable medium comprising software, which software, when executed by a computer system, may cause the computer system to perform operations for detecting stationary targets in a video sequence, the computer-readable medium comprising: instructions for receiving a sequence of video frames of an area of interest; instructions for constructing a first background model of the area of interest based on a first parameter; instructions for constructing a second background model of the area of interest based on a second parameter, the second parameter being different from the first parameter; instructions for determining a difference between the first and second background models; instructions for determining a stationary target based on the determined difference; and instructions for generating an alert concerning the stationary target.

An exemplary embodiment of the invention may include a video processing system, comprising: a background model engine to receive first, second, . . . , nth sequential video frames of an area of interest and construct first and second updatable background models, each background model being updated based on a corresponding first or second update parameters, wherein first and second parameters are pre-specified to differ from one another so that the constructed first and second background models are different from one another; a change detecting engine to compare pairs of corresponding pixels in the first and second background models and determine a difference between the first and second background models; a blob generating engine to generate blobs based on the determined difference; a blob classifying engine to determine a stationary target in the area of interest based on the generated blobs; and an alert generating engine to generate an alert regarding the stationary target.

An exemplary embodiment of the invention may include an application-specific hardware to perform a method comprising: receiving a sequence of video frames of an area of interest; constructing a first background model of the area of interest based on a first parameter; constructing a second background model of the area of interest based on a second parameter, the second parameter being different from the first parameter; determining a difference between the first and second background models; determining a stationary target based on the determined difference; and generating an alert concerning the stationary target.

BRIEF DESCRIPTION OF THE DRAWINGS

The foregoing and other features and advantages of the invention will be apparent from the following, more particular description of the embodiments of the invention, as illustrated in the accompanying drawings.

DEFINITIONS

Figure 1:
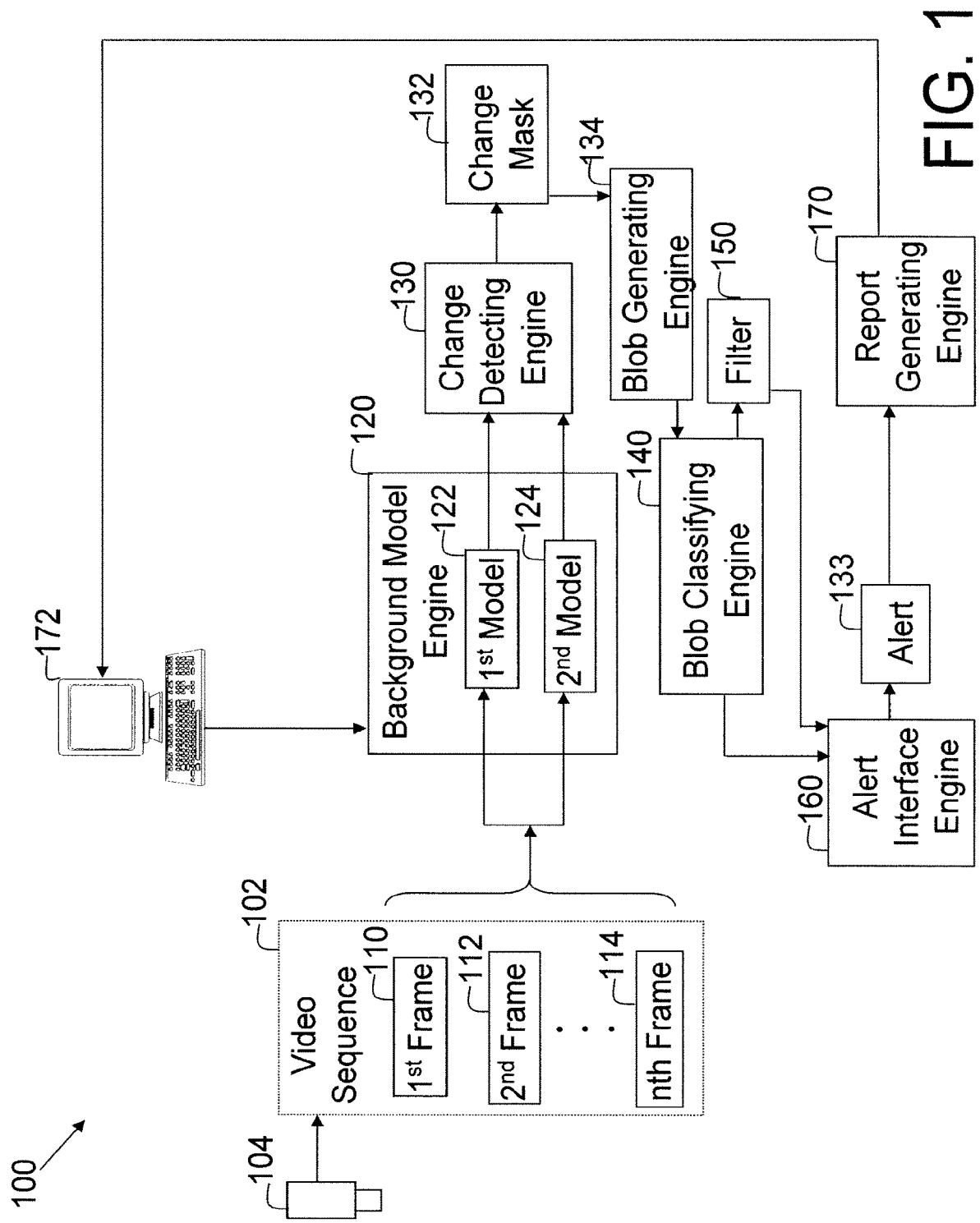
FIG. 1 is a diagrammatic illustration of an exemplary video system according to an exemplary embodiment of the invention.

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequences from a storage device, such as a computer-readable medium, a digital video disk (DVD), or a high disk drive (HDD); an image sequence from an IEEE 1394-based interface; an image sequence from a video digitizer; or an image sequence from a network.

A "video sequence" may refer to some or all of a video.

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; a personal computer (PC); application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a HDD, a floppy disk; an optical disk, such as a CD-ROM or a DVD or a Blu-ray Disk (BD); a magnetic tape; a flash removable memory; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internetwork, such as the Internet; an intranet, and an extranet; a local area network (LAN); a wide area network (WAN); a personal area network (PAN); an metropolitan area network (MAN); a global area network (GAN); and a combination thereof Exemplary networks may operate with any of a number of protocols.

DETAILED DESCRIPTION

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose.

With reference to FIG. 1, a detection system 100 may automatically detect stationary targets in a video sequence 102 provided, for example, by an imaging sensor or a video camera 104 observing an area of interest or a scene. More particularly, a first video frame 110, a second video frame 112, . . . , an nth video frame 114 may be provided sequentially to a background model engine 120, which may construct one or more background models, e.g., a representation of the static scene depicted in the video at any given time. More specifically, the background model engine 120 may construct first and second background models 122, 124 based on prespecified corresponding first and second update parameters, different from one another. E.g., each time a new frame is analyzed, the first and second background models 122, 124 may be incrementally updated by the background model engine 120 to construct new background models.

More specifically, the background model engine 120 may initialize the first background model (BM$_1$) 122 and the second background model (BM$_2$) 124 in the first video frame 110. The background model engine 120 may update the first background model 122 in the received second, . . . nth video frame 112, . . . , 114 based on the first update parameter such as a high learning rate L1. Updating the first background model with a first learning rate L1 results in the changes in the scene to be quickly learned as a background. The first learning rate L1 may be pre-specified to be equal to from approximately 5 sec to approximately 40 sec. In one exemplary embodiment, the first learning rate L1 may be pre-specified to be equal to approximately 5 sec.

The background model engine 120 may update the second background model 124 in the received second, . . . , nth video frame 112, . . . , 114 based on the second update parameter, such as a low learning rate L2, to have the changes in the scene appear later in the second background model 124 than in the first background model 122. The second learning rate L2 may be pre-specified to be greater than the first learning rate L1 and also greater than a stationary time t1 which denotes a lapse of time after which the target is deemed to be stationary. For example, the second learning rate L2 may be pre-specified to be greater than approximately 1 min and less than approximately 5 min. E.g., the first background model 122 may include the target when the target becomes stationary, while the second background model 124 might not include the same target which has just become stationary. It is contemplated that the background model engine 120 may construct more than two background models, such as, for example, three, four, . . . , ten background models.

A change detecting engine 130 may detect changes between a value of each pixel of the first background model 122 and a value of a corresponding pixel of the second background model 124 and generate a change mask 132.

Pixel-level changes in the background may occur due to first or target changes or second or local changes. The first changes may include targets or objects of interest. The detected targets may represent a target insertion or a target removal. The target insertion may occur when an object is placed or inserted in the scene. The target insertion may become a stationary target when the inserted target remains static for the stationary time t1. As described in detail below, an alert or alerts 133 may be generated for identified stationary targets. The target removal may occur when an object moves out of the scene and exposes an underlying section of the background model.

The second changes may include changes caused by unstable backgrounds such as, for example, rippling water, blowing leaves, etc.; by illumination changes such as, for example, clouds moving across the sun, shadows, etc; and camera set up changes such as, for example, changes in automatic gain control (AGC), auto iris, auto focus, etc. As described in detail below, the blobs representing the local changes may be identified and discarded.

A blob generating engine 134 may generate blobs or connected components from the change mask 132. Each generated blob may indicate a change in the background. As described in a greater detail below, a blob classifying engine 140 may classify the blobs into targets and determine whether any of the blobs represent the target change or the local change to the background. Further, the blob classifying engine 140 may classify the target change as a target insertion, e.g., target entering the scene, a target removal such as, target leaving the scene, or a stationary target, etc.

A filter 150 may filter blobs. For example, the filter 150 may perform size filtering. If the expected sizes of the targets are known in advance, the blobs that are not within the expected range may be ignored. In addition, if the calibration information is known, the actual sizes of targets may be obtained from the image and be used to eliminate the blobs that do not fit the sizes of reasonable targets, for example, vehicles, people, pieces of luggage, etc. In one exemplary embodiment, as described in detail below, the filter 150 may perform salience filtering to filter out erroneous results which may be caused by noise in measurement or processing.

An alert interface engine 160 may generate the alert 133 for the identified stationary targets. A report generating engine 170 may generate a report to be displayed in a human readable format on a display 172 or otherwise provided to an output device such as a printer, a remote station, etc.

Figure 2:
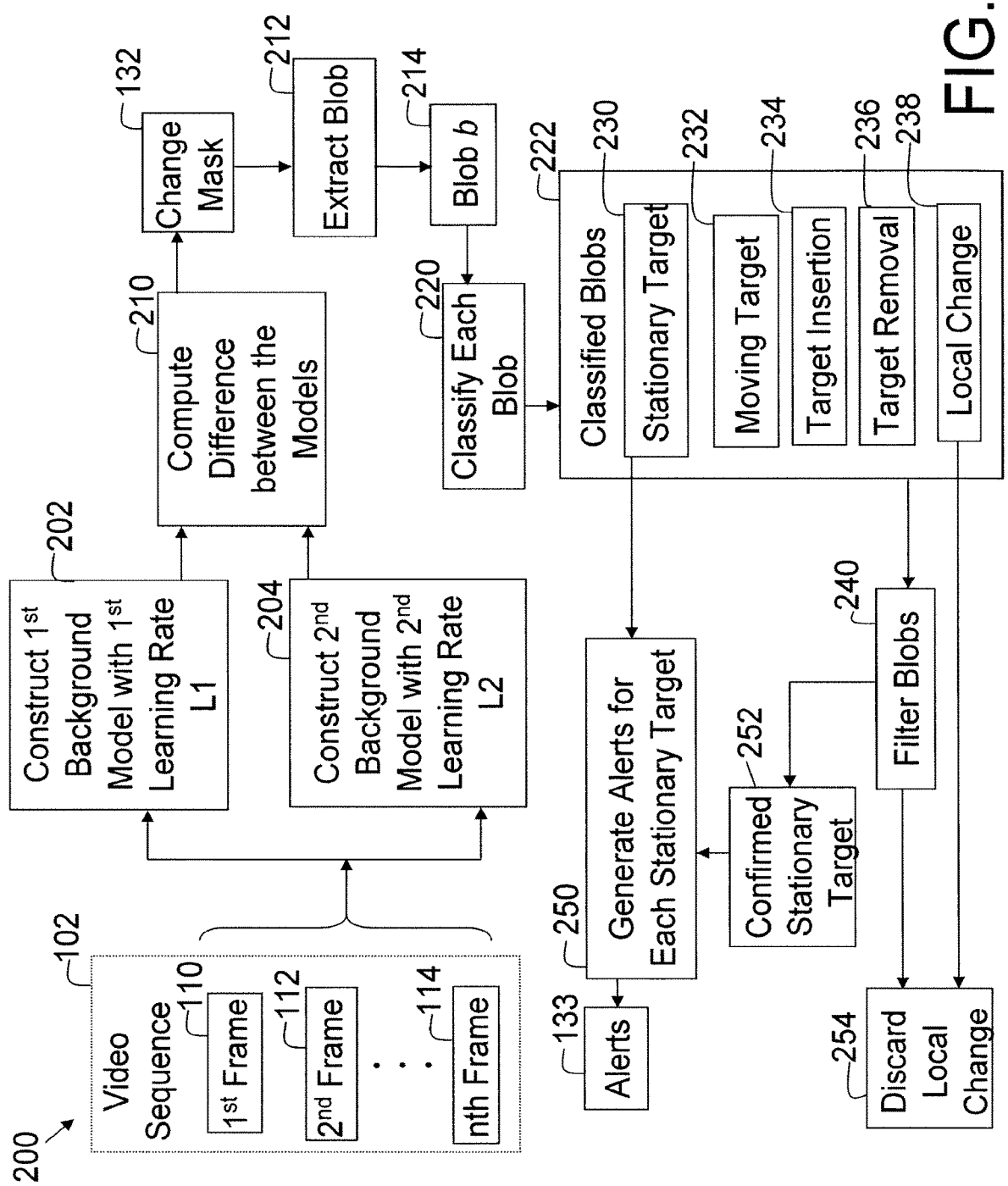
FIG. 2 is an illustration of a portion of an exemplary flow diagram for detecting stationary targets.

With continuing reference to FIG. 1 and further reference to FIG. 2, in a detection method 200, the video sequence 102 including the first, second, . . . , nth video frames 110, 112, . . . , 114 is obtained. In block 202, the first background model 122 may be constructed with the first update parameter, for example, the first learning rate L1. In block 204, the second background model 124 may be constructed with the second update parameter, for example, the second learning rate L2. In block 210, a difference between the first and second background models 122, 124 may be computed for each frame to receive, for example, the change mask 132. In block 212, a blob 214 may be extracted or generated. In block 220, each blob 214 may be classified into classified blobs 222. The classified blobs 222 may include a stationary target 230, a moving target 232, a target insertion 234, a target removal 236 or a local change 238. In block 240, the classified blocks 222 may be filtered to filter out erroneous results and verify and/or confirm that the blob represents a stationary target. In block 250, the alerts 133 for the classified stationary target 230 or a confirmed stationary target 252 may be generated. In block 254, blobs which represent the local change 238 may be discarded.

Figure 3A:
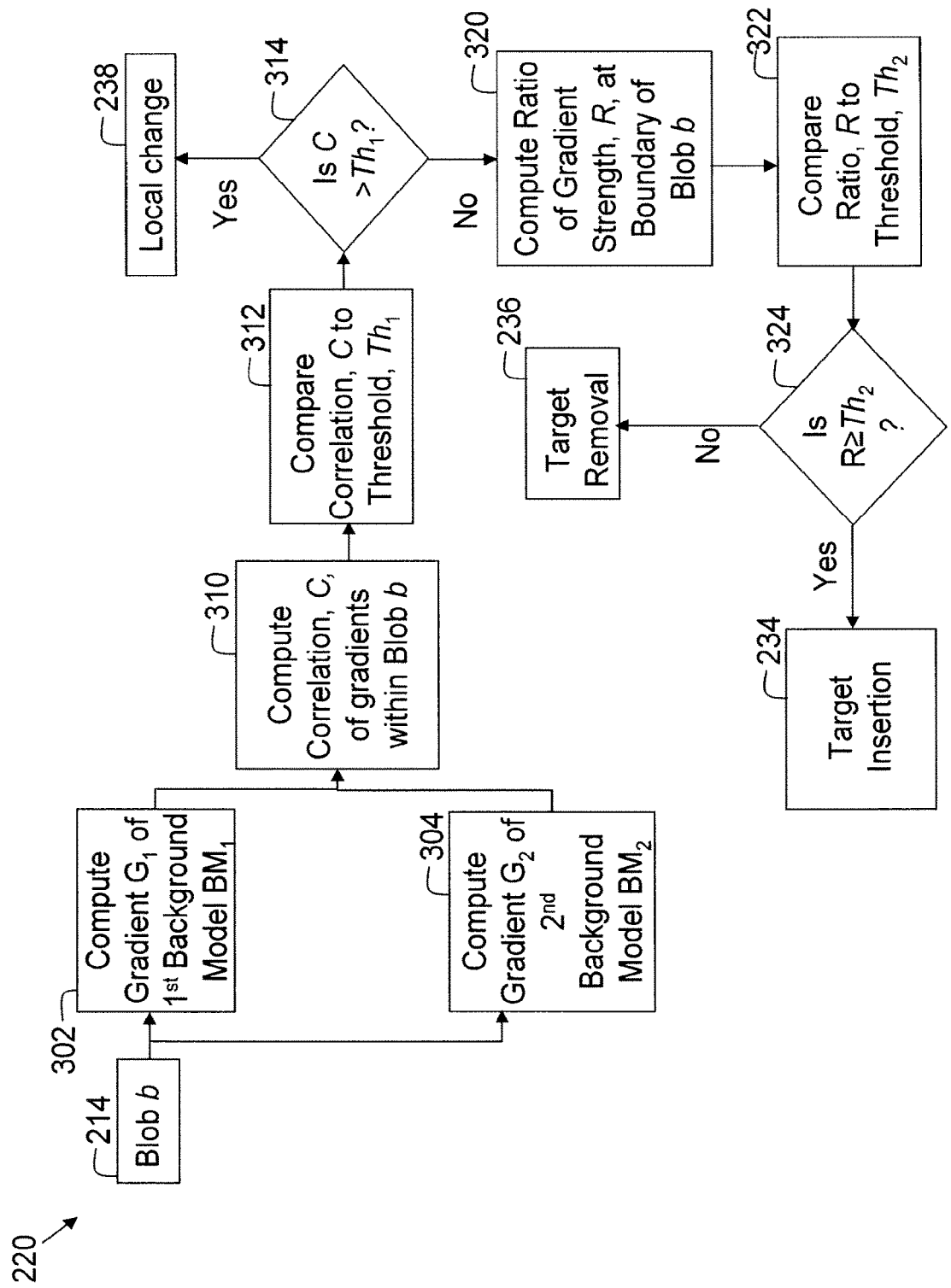
FIG. 3A is an illustration of a portion of an exemplary flow diagram for classifying blobs.
Figure 3B:
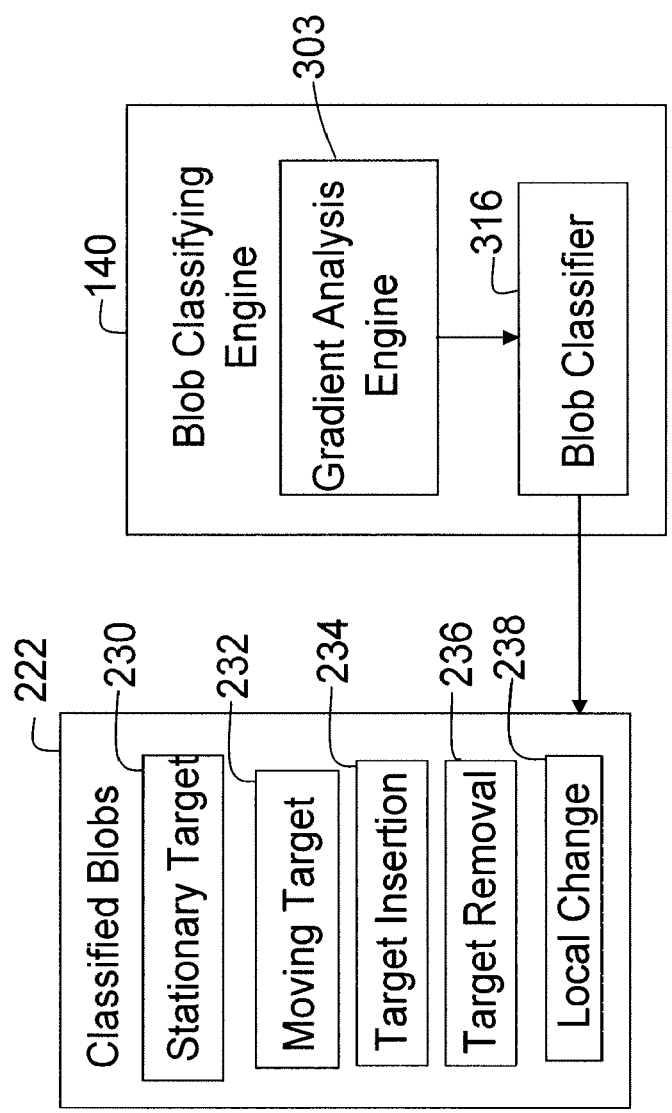
FIG. 3B is a diagrammatic illustration of a portion of an exemplary video system according to an exemplary embodiment of the invention.

With continuing reference to FIG. 1 and further reference to FIGS. 3A and 3B, in a blob classifying method 220, each blob 214 may be classified. In block 302, a first gradient or gradients G$_1$ within the blob 214 may be computed by a gradient analysis engine 303 for the first background model 122 as:

$$G_1 = \sqrt{\left(\frac{\partial BM_1}{\partial x}\right)^2 + \left(\frac{\partial BM_1}{\partial y}\right)^2}, \quad (1)$$

where BM$_1$ denotes the first background model.

In block 304, a second gradient or gradients G$_2$ within each blob 214 may be computed by the gradient analysis engine 303 for the second background model 124 as:

$$G_2 = \sqrt{\left(\frac{\partial BM_2}{\partial x}\right)^2 + \left(\frac{\partial BM_2}{\partial y}\right)^2}, \quad (2)$$

where BM$_2$ denotes the second background model.

In block 310, a correlation C may be computed by the gradient analysis engine 303 for the first and second gradients $G_1$, $G_2$ for each blob 214 as:

$$C(G_1, G_2) = \frac{2 \sum_x G_1(x) G_2(x)}{\sum_x G_1^2(x) + \sum_x G_2^2(x)} \quad (3)$$

In block 312, the computed correlation C may be compared to a predetermined first or correlation threshold $Th_1$. If the blob is formed due to the first or local changes, the gradients within the blob 214 do not change substantially for the first and second background models 122, 124. Hence, the correlation C between the first and second gradients $G_1$, $G_2$ may be high. Conversely, if a new object is inserted and/or becomes stationary, or if a previously stationary object is removed, the correlation C between the first and second gradients $G_1$, $G_2$ may be low. In block 314, if it is determined that the computed correlation C is greater than the correlation threshold $Th_1$, the blob may be classified as the local change 238 by a blob classifier 316.

If, in block 314, it is determined that the computed correlation C is less than or equal to the correlation threshold $Th_1$, the blob may be determined to be the target insertion 234 or the target removal 236 by further examining the gradients at the boundaries of the blob 214. In the case of insertions, the inserted object may be present in the rapidly updated first background model 122, but may not be visible in the slowly updated second background model 124. However, the situation is reversed in the case of removals. Thus, in the case of insertions, the gradients at the boundary of the blob 214 in the first background model 122 may be stronger than the gradients at the boundary of the blob 214 in the second background model 124.

More particularly, in block 320, a ratio R of gradient strengths of the first gradients $G_1$ at a boundary of the blob superimposed on the first background model 122 to gradient strengths of the second gradients $G_2$ at a boundary of the blob superimposed on the second background model 124 may be computed by the gradient analysis engine 303 as:

$$R = \frac{\sum_{x \in s(b)} G_1(x)}{\sum_{x \in s(b)} G_2(x)}, \quad (4)$$

where s(b) is the boundary of the blob.

In block 322, the computed ratio R may be compared to a predetermined second or ratio threshold $Th_2$. If, in block 324, it is determined that the computed ratio R is less than the ratio threshold $Th_2$, the blob may be classified as the target removal 236 by the blob classifier 316. If, in block 324, it is determined that the computed ratio R is greater than or equal to the ratio threshold $Th_2$, the target may be classified as the target insertion 234 by the blob classifier 316. The target insertions 234 may be monitored, tracked and confirmed as the stationary target. For example, the blob classifier 316 may include a timer which measures time during which the target is consistently detected as insertion. When the timer becomes greater than a pre-specified stationary time t1, the target may be classified as the stationary target.

Figure 4:
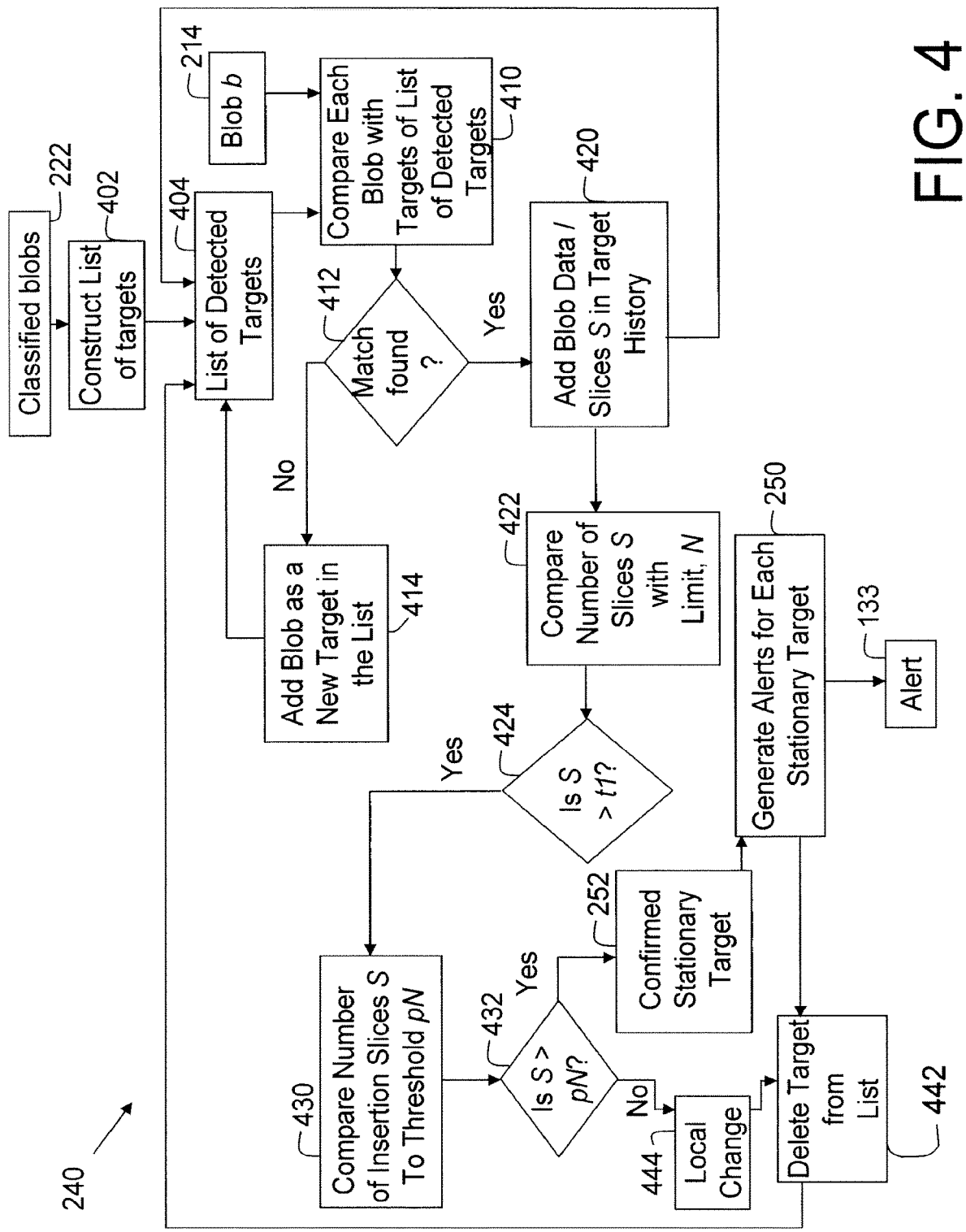
FIG. 4 is an illustration of another portion of an exemplary flow diagram for classifying blobs.

With continuing reference to FIG. 1 and further reference to FIG. 4, in a filtering method 240, the classified blobs 222 may be filtered to discard the erroneous results. Further, if the target insertion is determined, it may be determined if the inserted target is a stationary target. In block 402, a list 404 of targets is constructed. More specifically, the list 404 of targets may be initialized in the first frame 110. In subsequent frames 112, . . . , 114, the list 404 of targets may be updated to add the newly detected targets, remove the targets, or modify existing target information or history, etc. In block 410, each blob of each incoming frame may be compared to the targets in the list 404. In block 412, if no match is found, flow may proceed to a block 414. In block 414, a new target may be created in the list 404. If a match is found, flow proceeds to block 420. In block 420, the new measurement such as a target slice S may be added to the history of the matched target in the list 404. In block 422, a number of slices S may be compared to a predetermined third threshold or insertion limit N. In block 424, if it is determined that the number of slices S is greater than the insertion limit N, the target may be considered to be an insertion and flow may proceed to block 430. E.g., the target that is detected as an insertion consistently within a certain time window may be considered to be an insertion. In block 430, the number of insertion slices S may be compared to a predetermined fourth or stationary threshold pN, where p may be selected to be greater than 0 and less than or equal to 1. In block 432, if it is determined that the number of slices S is greater than or equal to the stationary threshold pN, the blob may be identified as the confirmed stationary target 252. In block 250, the alert or alerts 133 for the confirmed stationary target 252 may be generated as described above. In block 442, the identified and confirmed stationary target 252 may be deleted from the list 404 of targets.

If, in block 432, it is determined that the number of slices S is less than the stationary threshold pN, the blob may be classified as a local change 444. The flow may proceed to the block 442 and the target corresponding to the local change may be removed from the list 404 of targets.

Figure 5:
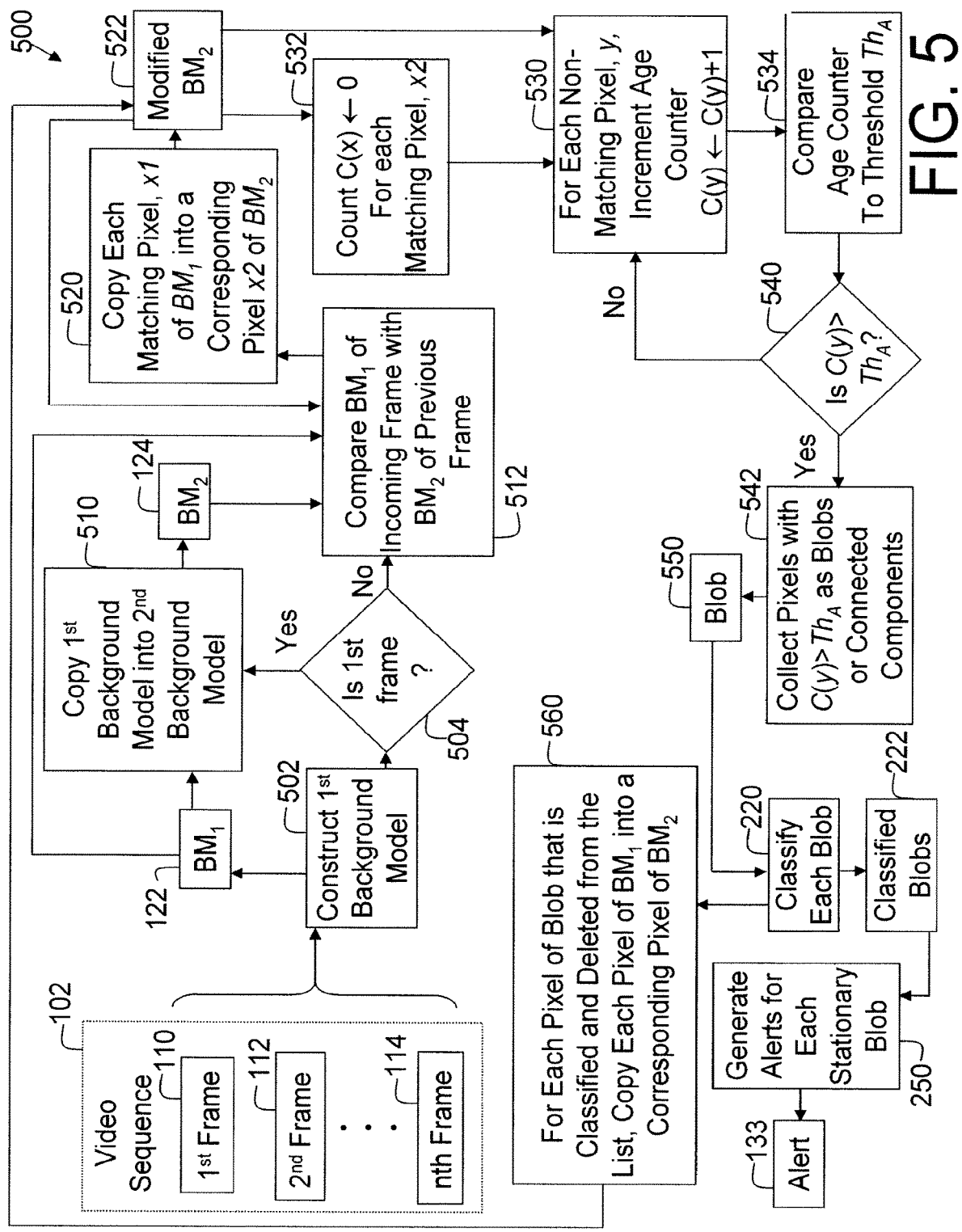
FIG. 5 is an illustration of a portion of an exemplary flow diagram for detecting stationary targets.

With continuing reference to FIG. 1 and further reference to FIG. 5, an alternative detection method 500 is illustrated. In the detection method 200 of an exemplary embodiment of FIG. 2, the first background model 122 may be updated faster than the second background model 124. The first and second background models may be constructed from the incoming frames. In the alternative embodiment of FIG. 5, the second background model may be constructed based on the first background model with a variable update rate.

More specifically, in block 502, the first background model 122 may be constructed for each incoming frame. In block 504, if it is determined that the first background model 122 is constructed in the first video frame 110, flow proceeds to a block 510. In block 510, values of pixels of the first background model 122 may be copied into values of corresponding pixels of the second background model 124 to initialize the second background model 124. If, in block 504, it is determined that the first background model 122 is not constructed in the first video frame 110, flow may proceed to a block 512.

In block 512, a value of each pixel of the first background model 122 constructed for the incoming frame may be compared with a value of a corresponding pixel of the second background model 124 constructed for the previous frame to determine matching and non-matching pixels. In block 520, matching pixels of the first and second background models, that are determined to match each other within a predetermined matching pixel threshold $Th_m$, may be made identical by copying the values of the matching pixels x1 of the first background model 122 into the corresponding matching pixels x2 of the second background model 124. A modified second background model 522 may be constructed.

In block 530, for each non-matching pixel y of the modified second background model 522, an age counter, which represents an amount of time that lapsed since the change in the non-matching pixel y occurred, may be incremented.

In block 532, for each matching pixel x2 of the modified second background model 522 the age counter is reset to 0.

In block 534, the age counter may be compared to a predetermined age counter threshold $Th_A$. In block 540, if it is determined that the age counter of the non-matching pixels greater than the age counter threshold $Th_A$, flow proceeds to block 542. In block 542, the non-matching pixels may be collected into blobs 550. In block 220, each blob 550 may be classified into the classified blobs 222 as described above with reference to FIGS. 2, 3A and 3B. The blobs may be filtered, as described above with reference to FIG. 4, to filter out erroneous results. In block 250, the alerts 133 for the stationary targets may be generated.

In block 560, for each pixel of the blob that has been classified or deleted from the list of targets as a result of filtering, a value of each pixel of the first background model 122 may be copied into a value of a corresponding pixel of the second background model 522.

In the manner described above, the second background model 124, 522 may be updated with a variable update rate.

In one embodiment, a priori information may be available to the classifier to classify each blob in one of the known classes of objects, such as, for example, a person, a vehicle, a piece of luggage, or the like. Image based classification techniques require extraction of features from images and training the classifier on the feature set based on previously identified set of images. Such image classifiers are known in the art. Examples of classifiers include linear discriminant analysis (LDA) classifiers, artificial neural networks (ANN) classifiers, support vector machines (SVM) classifiers, and Adaptive Boosting (AdaBoost) classifiers. Examples of features include Haar-like features, complex cell (C2) features, shape context features, or the like.

Since the background model is devoid of the moving targets in the scene, the performance of the present invention may not be affected by the traffic density in the scene. Similarly, the presence of moving targets occluding the stationary target may not hurt the performance of the invention.

The described above may be applicable to video understanding in general. For example, video understanding components may be improved by providing additional information to the automated systems regarding the events in the scene.

The described above may further be applicable to security and video surveillance by improved detection of video events and threats that involve detection of stationary targets, such as, detection of left bags at a metro station or an airport, detection of left objects at train tracks, etc.

The described above may further be applicable to traffic monitoring such as detecting illegally parked vehicles, such as vehicles parked at curbside.

The described above may further be applicable to space management such as detecting parked vehicles may also be used to detect and count the vehicles parked in a parking space for better space management.

The described above may further be applicable to unusual behavior detection, e.g., detecting stationary targets may also enable detecting unusual behavior in the scene by detecting when something remains stationary for an unusually longer period of time. For example, user-alerts may be generated if a person falls and remains stationary.

Embodiments of the invention may take forms that include hardware, software, firmware, and/or combinations thereof Software may be received by a processor from a computer-readable medium, which may, for example, be a data storage medium (for example, but not limited to, a hard disk, a floppy disk, a flash drive, RAM, ROM, bubble memory, etc.). Software may be received on a signal carrying the software code on a communication medium, using an input/output (I/O) device, such as a wireless receiver, modem, etc. A data storage medium may be local or remote, and software code may be downloaded from a remote storage medium via a communication network.

The engines of the invention may be executed with one or more processors.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

The invention claimed is:

1. A computer-implemented method for processing one or more video frames, the method comprising:
   generating, using the one or more video frames, a first background model with an associated first learning rate;
   generating, using the one or more video frames, a second background model with an associated second learning rate different than the first learning rate;
   comparing the first background model and the second background model to generate a comparison; and
   generating one or more blobs in response to the comparison.

2. The computer-implemented method as claimed in claim 1 further comprising classifying each of the one or more blobs using an artificial neural network classifier.

3. The computer-implemented method as claimed in claim 2 wherein the artificial neural network classifier is configured to classify the one or more blobs in at least a first class of object and a second class of object different than the first class.

4. The computer-implemented method as claimed in claim 3 wherein the first class of object is a person.

5. The computer-implemented method as claimed in claim 4 wherein the first class of object is a vehicle.

6. The computer-implemented method as claimed in claim 4 wherein the first class of object is a piece of luggage.

7. The computer-implemented method as claimed in claim 1 wherein the second learning rate is slower than the first learning rate.

8. The computer-implemented method as claimed in claim 1 further comprising performing salience filtering to filter out erroneous results.

9. The computer-implemented method as claimed in claim 1 further comprising carrying out classifications of the one or more blobs by performing a plurality of gradients calculations taking into account the first and second background models.

10. A non-transitory computer-readable medium containing instructions which, when executed on a processor, perform a method for processing one or more video frames, the method comprising:
- generating, using the one or more video frames, a first background model with an associated first learning rate;
- generating, using the one or more video frames, a second background model with an associated second learning rate different than the first learning rate;
- comparing the first background model and the second background model to generate a comparison; and
- generating one or more blobs in response to the comparison.

11. The non-transitory computer-readable medium as claimed in claim 10 wherein the method further includes classifying each of the one or more blobs using an artificial neural network classifier.

12. The non-transitory computer-readable medium as claimed in claim 11 wherein the artificial neural network classifier is configured to classify the one or more blobs in at least a first class of object and a second class of object different than the first class.

13. The non-transitory computer-readable medium as claimed in claim 12 wherein the first class of object is a person.

14. The non-transitory computer-readable medium as claimed in claim 12 wherein the first class of object is a vehicle.

15. The non-transitory computer-readable medium as claimed in claim 12 wherein the first class of object is a piece of luggage.

16. The non-transitory computer-readable medium as claimed in claim 10 wherein the second learning rate is slower than the first learning rate.

17. The non-transitory computer-readable medium as claimed in claim 10 wherein the method further includes performing salience filtering to filter out erroneous results.

18. The non-transitory computer-readable medium as claimed in claim 10 wherein the method further includes carrying out classifications of the one or more blobs by performing a plurality of gradients calculations taking into account the first and second background models.

* * * * *